March 23, 1937.  J. MANTELET  2,074,794

SIEVE

Filed May 4, 1935

Inventor:
Jean MANTELET
by [signature]
Attorneys

Patented Mar. 23, 1937

2,074,794

UNITED STATES PATENT OFFICE 2,074,794

SIEVE

Jean Mantelet, Bagnolet, France, assignor to Mantelet & Boucher (Societe en nom Collectif), Bagnolet, France Application May 4, 1935, Serial No. 19,890
In Luxemburg May 17, 1934

2 Claims. (Cl. 146—175)

The present invention relates to mashers including a sieve in the shape of a body of revolution and compression member adapted to rub against said sieve by turning about the axis of said body of revolution.

The object of the present invention is to provide a masher of this kind which is better adapted to meet the requirements of practice.

The chief feature of the invention lies in the fact that the holes of the sieve are so arranged as to leave between them a plurality of coaxial annular strips and a plurality of rectilinear strips located at equal intervals from one another and connecting together two adjacent annular strips, so that all the rectilinear strips that extend between two adjacent annular strips make the same acute angle with radial planes intersecting them respectively.

Other features of the present invention will result from the following detailed description of some embodiments thereof.

Preferred embodiments of the present invention will be hereinafter described with reference to the accompanying drawing, given merely by way of example, and in which.

Figure 1:
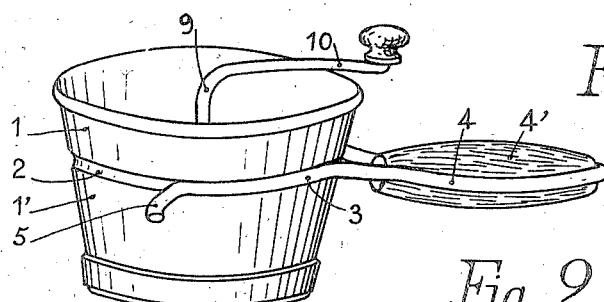
Figs. 1 and 2 are a perspective view and a plan view respectively of a masher made according to the invention.
Figure 3:
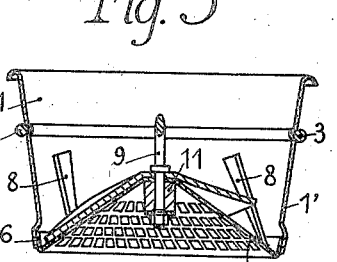
Fig. 3 is a sectional view on the line 3—3 of Fig. 2.
Figure 2:
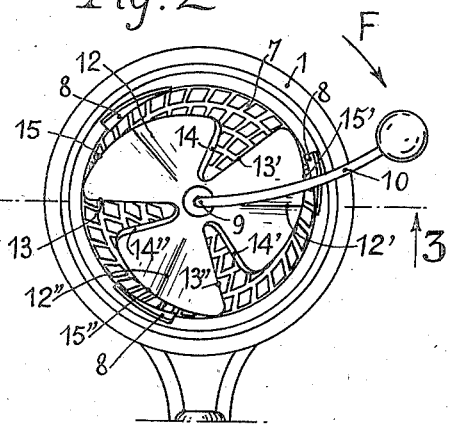
Figure 4:
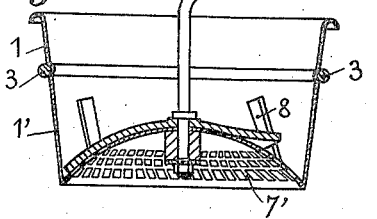
Figs. 4 and 5 are sectional views, similar to Fig. 3, and showing two other embodiments of a masher according to the present invention, respectively.
Figure 5:
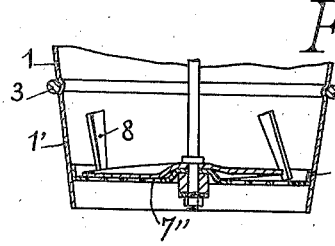

The mashers shown in Figs. 1 to 5 include a conical lateral wall made of two portions 1 and 1' connected together by an intermediate band 2 against which are engaged and fixed by soldering the branches 3 of a fork-shaped element the intermediate part 4 of which carries a handle 4' made of wood or another material having good heat insulating properties. The ends 5 of branches 3 are bent downwardly so as to form hooks for fixation of the apparatus on any vessel, such for instance as a saucepan.

The perforated bottom 7 (Figs. 2 and 3), 7' (Fig. 4), or 7" (Fig. 5), provided with holes so as to form the sieve above mentioned, is fixed, through its bent edge 6, to the lower edge of conical portion 1', for instance by soldering. In a hub 11, rigid with the central part of this sieve, there is journalled, in any suitable manner, a spindle 9 provided at its upper end with a crank 10 for operating the apparatus. On this spindle are keyed three compressing members 12, 12' and 12" (Figs. 2 to 5) evenly distributed about said spindle.

Each of these members is given the shape of a portion of a helical surface, the lower edge 13, 13' or 13" of which is in contact with the sieve, while the upper edge 14, 14' or 14" is located at a sufficient distance from the sieve for catching the matter to be compressed between the element 12, 12' or 12" and said sieve. The peripheral edge 15, 15' or 15" of each compressing member 12, 12' or 12" respectively is substantially in contact, at its lower end with the lateral wall of the vessel, but at its upper end it is at a substantial distance from said wall, so as to leave between said peripheral edge and said lateral wall a space, through which the matter can escape, which increases gradually from the lower end of said lateral edge of each compressing member toward the upper end of said edge.

On the inner face of the lateral wall 1' of the vessel I provide scraping blades 8, the free edges of which are adapted to cooperate with the peripheral edges of the compressing members, that is to say with edges 15, 15' and 15", so as to scrape and disintegrate the matter to be treated when the said matter is driven along by the compressing members.

Figure 6:
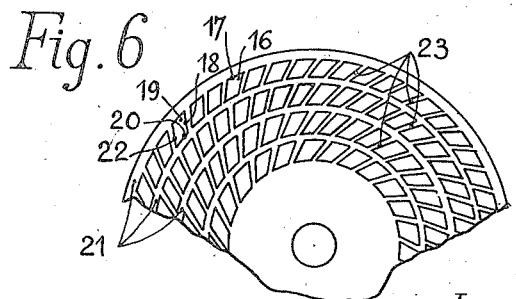
Fig. 6 is a partial plan view, on an enlarged scale of the sieve employed in connection with the mashers disclosed by the preceding figures.

In the embodiments of Figs. 1 to 5, the holes of the sieve are made as shown in the plan view of Fig. 6.

Each perforation includes a wedge-shaped portion 16 extending in a forward direction, that is to say in the direction F in which the helical compressing member is intended to move. This elongated wedge-shaped portion is limited by two converging edges 17, 18, making an acute angle with each other. The matter to be mashed is forced by the compression exerted by the helical-shaped member into the wider part 19 of the perforation, then, when driven by the lower edge of said helical member, it is wedged in the angular portion 16 of this perforation, between edges 17 and 18. These edges act as knives and cut off a small particle of the matter, which drops under the sieve.

It will be readily understood that the dimensions of the perforations must be in accordance with the nature of the matter to be mashed or otherwise disintegrated. For instance, with soft matters, such as potatoes or analogous vegetables, the dimensions of the perforations must be smaller than those of sieves for the treatment of fibrous vegetables, herbs, or meat.

In the embodiments shown in Figs. 2 to 6 each perforation consists of a quadrilateral having two curved sides 17 and 20 limited by concentric circular strips 21, and two rectilinear sides 18 and 22 limited by transverse strips connecting said circular strips to one another. Sides 18 and 17, on the one hand, and 20 and 22, on the other hand, make acute angles with each other. With this arrangement, the area of the perforations is maximum while the area of the solid portions is minimum, this being a necessary condition for a quick and easy treatment of the matter.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A masher including a sieve consisting of a metal sheet in the form of a body of revolution provided with a plurality of holes leaving between them a series of coaxial annular strips and a plurality of substantially rectilinear strips located at equal intervals from one another and connecting together two adjacent annular strips, all of the last mentioned strips that extend between two adjacent annular strips making the same acute angle with radial planes intersecting them respectively, and a rotary compression member bearing against said sieve and adapted to turn about the axis of said body of revolution.

2. A sieve consisting of a metal sheet in the form of a body of revolution, according to claim 1, in which the edges of each of the second mentioned strips are parallel to each other, whereby said holes have each the shape of a quadrilateral two sides of which consist of the edges of two adjacent annular strips while the other sides consist of the edges of two of the second mentioned strips.

JEAN MANTELET.